May 4, 1948.　　　　R. M. ORZABAL　　　　2,441,079
SELF-STARTING SYNCHRONOUS ELECTRIC MOTOR
Filed Feb. 12, 1947　　　2 Sheets-Sheet 1
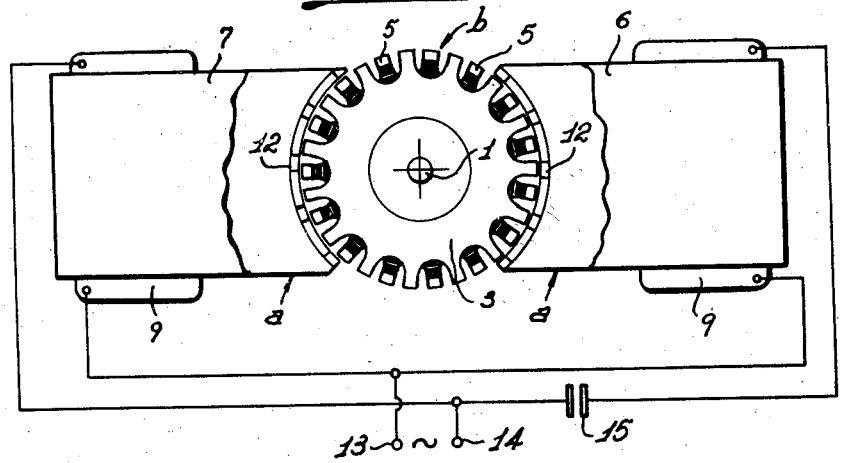
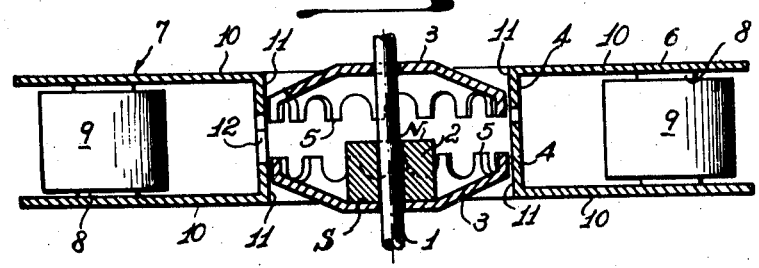
INVENTOR
Raul Mariano Orzabal
BY
ATTORNEY May 4, 1948.  R. M. ORZABAL  2,441,079
SELF-STARTING SYNCHRONOUS ELECTRIC MOTOR
Filed Feb. 12, 1947  2 Sheets—Sheet 2

INVENTOR,
Raul Mariano Orzabal
BY Ivan P. Tashof
ATTORNEY

Patented May 4, 1948

2,441,079

UNITED STATES PATENT OFFICE 2,441,079

SELF-STARTING SYNCHRONOUS ELECTRIC MOTOR

Raul Mariano Orzabal, Buenos Aires, Argentina

Application February 12, 1947, Serial No. 728,006
In Argentina May 29, 1946

7 Claims. (Cl. 172—278)

This invention relates to self-starting synchronous electric motors, and more particularly to a self-starting synchronous electric motor of fractional horsepower and low speed.

Fractional horsepower synchronous motors are usually employed for all applications where a driving means with a very constant speed of rotation is desired, such as, for example, in electric clocks or phonograph record players. In these applications, it is generally desirable that the motors be of the self-starting type. It has been found however, that with the present designs of fractional horsepower synchronous motors the self-starting characteristic can be obtained by increasing the rotationol speed, so that in applications which call for a low speed on the drive shaft, it is necessary to employ gears or other speed reducing devices, which obviously complicate the design and increase the cost of the devices incorporating synchronous motors.

The electric motor according to the present invention, however, has been designed to start instantaneously as soon as it is connected to the power source, and to run at such a low speed that it can be used to drive slow-movement devices, such as record players, directly and without the intermediary of speed-reducing accessories.

For this purpose, the self-starting synchronous motor according to the present invention includes, as principal elements, an electro-magnetically excited multipolar field magnet and a multipolar armature polarized by a permanent magnet and having a number of poles equal to that of the field magnet, the poles of which are grouped in sections of equal polar spacing with the poles arranged alternately in succession, the alternating magnetic exciting fields of said polar sections having the same frequency but being electrically out of phase with respect to one another. Furthermore, the poles of two adjacent sections of one of the above-mentioned elements of the motor are mounted with a mechanical phase displacement equivalent to the electrical phase displacement between the magnetic fields of the field magnet.

The term "polar section" in the description and claims of this invention must be read to cover that part of the rotor or stator of the motor which includes a plurality of opposite poles disposed alternately and excited in phase by the same field. As stated above, in all the polar sections of the motor the poles are disposed with the same polar spacing and the mechanical phase displacement between two adjacent polar sections may also be stated as being equal to a fraction of the polar spacing, the numerator of said fraction being equal to one and the denominator susbtantially equal to the number of polar sections multiplied by two.

Thus, various objects and advantages are attained, notable among which is the possibility of obtaining a self-starting synchronous motor of slow rotational speed.

Another object of this invention is to provide a self-starting synchronous motor of simple and compact construction, and of small size.

A further object of this invention is to provide a self-starting synchronous motor, the rotor and stator of which may be manufactured in the form of sheet iron stampings, with the consequent reduction in cost of the motor.

Further objects and advantages of this invention will become apparent in the course of the following detailed description in connection with the drawings, in which:

Figs. 1 and 2 are a plan view and longitudinal section respectively, of one of the preferred embodiments of the motor in accordance with the present invention, Fig. 2 showing an exploded view of the rotor, partly in section;

Fig. 3 is a schematic diagram representing the layout of the poles of the rotor and stator of a motor of the type shown in the previous figures;

In the figures, the same reference numbers or letters identify similar or corresponding parts.

Figure 4:
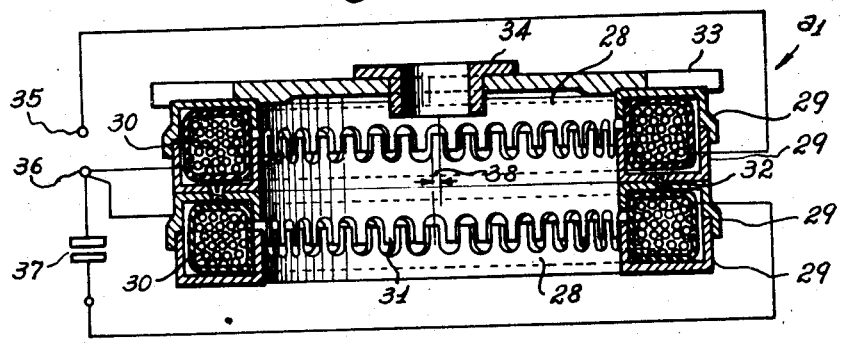
Fig. 4 is a longitudinal cross-section of the multiple field magnet comprising two superposed polar sections of a motor according to another embodiment of the invention.

Referring to the drawings, it will be seen that the self-starting synchronous electric motor according to this invention comprises a field magnet $a$ and an armature $b$ which, in the embodiments shown in the drawings, constitute the stator and rotor respectively of the motor, it being evident that, if required, it is also possible to design field magnet $a$ as a rotor and armature $b$ as a stator, without deviating from the basic constructive characteristics of the motor according to this invention.

Rotor $b$ comprises a shaft or axle $l$, on which an annular permanent magnet 2 is mounted concentrically, with its N and S poles in direct contact with corresponding discs 3 which, fixed perpendicularly to shaft 1, are provided with toothed peripheral rims 4 located in an annular plane substantially concentric with shaft 1 of the rotor, teeth 5 of said rims being uniformly distributed along the whole circumference of rim 4, as shown in Fig. 2. Discs 3 of the rotor thus constitute the pole pieces of permanent magnet 2, and as teeth 5 of one disc enter the gaps between teeth 5 of the other disc, rotor b of the synchronous motor shown in the embodiment of Figs. 1 and 2, effects the form of a relatively thin discoid body the peripheral rim of which comprises a plurality of teeth which constitute opposite magnetic poles in an alternate arrangement.

Field magnet a of the motor illustrated in Figs. 1 and 2 comprises two polar sections 6 and 7 each one formed by a core of magnetizable material 8, on which is disposed an exciter coil 9, and the ends of which carry corresponding pole pieces 10 between which is mounted the armature or rotor b of the motor. As can be seen in Figs. 1 and 2, these ends of the pole pieces between which is located rotor b, are cut along the periphery of a virtual circle having a radius slightly larger than that of rotor b, and are provided with perpendicular toothed flanges 11, teeth 12 of which are spaced with a polar spacing equal to that of rotor b, and which, once polar pieces 10 are fixed to their respective cores 8, are alternately disposed with the teeth 12 of the upper polar piece located between the teeth 12 of the lower polar piece. In this manner field magnet or stator a of the self-starting synchronous motor according to the embodiment illustrated in Figs. 1 and 2 has two polar sections 6 and 7, each of which comprises a plurality of successive opposite magnetic poles formed by teeth 12 in an alternate arrangement, the polar spacing between these teeth being equal to that of rotor b.

As may be seen in Fig. 1, exciter coil 9 of polar section 7 is connected directly to terminals 13 and 14 of an alternating current supply source, while the exciter coil of polar section 6 is connected to the same source in series with a reactance 15 constituted in the present instance by a capacitor, so that the alternating magnetic exciter fields generated by the poles corresponding to the directly-connected coil of polar section 7 have their phase differing by substantially ninety electrical degrees with respect to the alternating magnetic exciter fields generated by the poles excited by the exciter coil of polar section 6 connected in series with capacitor 15.

But, in addition to the fact that the corresponding alternating exciter magnetic fields of the polar sections of the field magnet or stator a of the motor are of the same frequency and are electrically out of phase one with respect to another, the poles of one of the sections of stator a are mounted with a mechanical phase difference, equivalent to the electrical phase displacement, with respect to the poles of the other section of the stator, said mechanical phase difference being equal to a fraction of the polar spacing, the numerator of this fraction being one and the denominator being substantially equal to the number of polar sections multiplied by two.

The relative position of the poles of the polar sections of field magnet a of the motor described in this invention and illustrated in Figs. 1 and 2 may be more clearly seen in Fig. 3 which, in schematic form, illustrates a motor of the type shown in Figs. 1 and 2, but in which, for purposes of simplification, stator a' is shown with two polar sections 18 and 19 each comprising four poles 20, 21, 22, 23, and 20', 21', 22' and 23', respectively. As may be seen in this figure, the poles of polar section 18, which together with the poles of polar section 19 of stator a', are distributed along the periphery of a virtual circle 16 centered on shaft 1' of rotor b' of the motor, are mounted with a mechanical phase shift 17 with respect to the poles of polar section 19. Distance 17 is equal to one quarter of the polar spacing of the stator; for, in the embodiment of the motor illustrated in Figs. 1 and 2, and also in the motor shown schematically in Fig. 3, the stator of the motor is formed of two polar sections.

Taking the distance between the poles of the same polarity of the stator as being equivalent to three hundred sixty electrical degrees, and taking into account that the electrical phase displacement between the alternate exciting fields of the two polar sections of the stator is equal to 90 electrical degrees, it will be seen that the mechanical phase displacement between the two polar sections of the stator is the equivalent of the electrical phase displacement between the magnetic exciting fields.

Those skilled in the art will understand that a mechanical phase displacement equal to ¼ of the polar spacing of the stator is, in the case of a motor including a stator of two polar sections, the minimum phase displacement which must exist between the two polar sections, as in fact this mechanical phase displacement may be equal to any multiple of the polar spacing plus the fraction of the polar spacing equivalent to the electrical phase displacement.

In the motor shown schematically in Fig. 3, rotor b' contains eight N and S poles disposed alternately and distributed with a polar spacing equal to that of stator a', as described hereinabove in connection with Figs. 1 and 2. The poles of stator a' and rotor b' have been represented by simple lines which carry the corresponding reference number given hereinbefore and which correspond to teeth 12 and 5 of stator a and rotor b of the motor shown in Figs. 1 and 2.

The synchronous rotation of the motor according to the invention combined with self-starting characteristic has been obtained due to the fact that the poles of the stator are grouped in polar sections of successive opposite poles whose respective magnetic exciter fields are of the same frequency, but have their phases shifted one with respect to another, and that the poles of two adjacent polar sections are mounted with a mechanical phase shift one with respect to another, said mechanical phase shift being equivalent to the electrical phase displacement of the magnetic exciter fields. As a consequence, whatever the relative position of the poles of the rotor with respect to the poles of the polar section of the stator at the moment of connecting the exciter coils of the field magnet to the alternating current power source, one group of the poles of the rotor is closer to the poles of one of the polar sections of the stator than to the poles of the other polar section, as may be seen clearly in the schematic diagram of Fig. 3.

In effect, assuming that at the moment of connection of the exciting current to the coils of stator a', rotor b' is in the position shown in Fig. 3, it will be seen that four of the poles of the rotor are directly opposite poles 20, 21, 22 and 23 of polar section 18 of the stator, but that the remaining four poles of the rotor are equidistant with respect to poles 20', 21', 22' and 23' of polar section 19 of stator a'. Now, in view of the alternating excitation of the stator, and taking for instance, only one pair of adjacent poles of the stator, it will be seen that at a given moment pole 20' will be N, and pole 21' will be S during one half of the cycle of the alternating exciting current applied to polar section 19 of the stator. Therefore, the N pole of the rotor located between poles 20' and 21' of the stator will be repelled by pole 20' and attracted by pole 21'.

In view of the fact that the forces of repulsion and attraction act in the same direction, and as these forces are applied to all the poles of the rotor which are located opposite the corresponding polar section of stator a', rotor b' of the motor according to this invention will start rotating in a clockwise direction.

Now, as the excitation of poles 20, 21, 22 and 23 of polar section 18 of the stator is displaced in phase 90 electrical degrees with respect to polar section 19 of the stator, the electromagnetic fields of attraction and repulsion generated by the poles will act upon the N and S poles of the rotor to cooperate in its rotation in the established direction, in such a way that after a short interval rotor b' of the motor according to the present invention will rotate as the rotor of a synchronous motor due to the alternate attractions exercised by the poles of the stator on the poles of the rotor. It is evident that once synchronous speed is reached, the speed of rotation of the motor in the motor according to this invention will depend upon the number of poles and the frequency of the exciting current, as in any other synchronous motor, that is, that the rotor will rotate at $$\frac{f \times 60}{m} = \text{revolutions per minute}$$

where $f$ is the frequency of the alternating exciting current, and $m$ is the number of poles in the stator.

In the embodiment of the self-starting synchronous motor illustrated in Figs. 1 and 2, the polar sections of field magnet or stator $a$ are located in the same plane and act upon the same rotor or armature $b$ of a single polar section. In another preferred embodiment of the motor according to the present invention, shown in Figs. 4 and 5, both, the stator and the rotor of the motor, are of multiple construction, in which each polar section of the one of the elements cooperates with a polar section of the other element of the motor.

Figure 5:
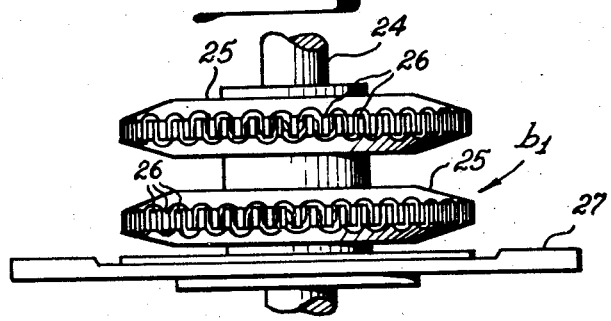
Fig. 5 is a lateral view of the multiple armature comprising two superposed polar sections and corresponding to the field magnet shown in Fig. 4.

As may be seen in Fig. 5, the multiple armature or rotor $b_1$ of the motor according to this embodiment of the invention comprises a shaft 24, on which two rotors 25 are mounted concentrically and in superposed relationship, these rotors being equal to rotor $b$ shown in Figs. 1 and 2. Rotors 25 are fixed to shaft 24 with their poles or teeth 26 in mechanical alignment, and the lower end of shaft 24 is rotatably mounted on a plate 27 which is bolted to multiple field magnet or stator $a_2$ of the motor shown in Fig. 4. As may be seen in this figure, stator $a_1$ also comprises two polar sections 28, each formed by two halves constituted by annular bodies 29 of U section joined together to form an annular enclosure which encloses an exciting coil 30. The inner wall of each annular body 29 is provided with teeth 31 spaced at a distance equal to the polar spacing of the motor and the two halves of each polar section 28 are joined together in such a way that teeth 31 of one of the halves are located between teeth 31 of the other half, so that in each polar section, the poles formed by the abovementioned teeth 31, are disposed alternately.

The two polar sections 28 are joined together by means of bolts 32 or other suitable means of attachment, to form stator $a_1$ which carries in addition another bearing plate 33 provided with a bush or bearing 34 for shaft 24 of multiple rotor $b_1$.

As has been shown schematically in Fig. 4, exciting coil 30 of the upper polar section 28 of the stator is connected directly to terminals 35 and 36 of an alternating current source, while exciting coil 30 of lower polar section 28 is connected to the same terminals in series with a capacitor 37, so that the exciting magnetic fields of both polar sections of the motor according to the embodiment illustrated in Figs. 4 and 5 have their phases shifted by substantially ninety degrees one with respect to another.

The mechanical phase difference between the poles of the two polar sections 28 of the motor shown in Figs. 4 and 5 has been obtained by offsetting one section with respect to the other, so that this mechanical phase difference between the poles of the two sections, designated in Fig. 4 with reference number 38, is equal to one quarter of the polar spacing. The separation between the two rotors 25 of rotor $b_1$ is such that, once the rotor is mounted in stator $a_1$, each rotor 25 rotates with its poles in a plane corresponding to the poles or teeth 31 of the corresponding polar section 28 or stator $a_1$, synchronous rotation with the self-starting feature of the motor being obtained due to the electrical and mechanical phase displacement between the polar sections of the stator.

In the synchronous motor according to Figs. 4 and 5, the two polar sections of the stator are mechanically displaced in phase, apart from the electrical phase displacement of their exciting coils, to obtain the self-starting characteristic of the motor, but it is evident that in synchronous motors, comprising multiple elements according to this invention, the mechanical phase displacement may also be introduced between the polar sections of the rotor, this disposition also ensuring self-starting and synchronous rotation.

Those skilled in the art will understand also that, in place of employing a motor with double rotor or stator, said elements can be also used in triple, or, more generally, in multiple form, provided always that the electrical phase displacement between the exciting magnetic fields of the stator be equivalent to the mechanical phase displacement between the polar sections, either of the rotor or the stator.

Figure 7:
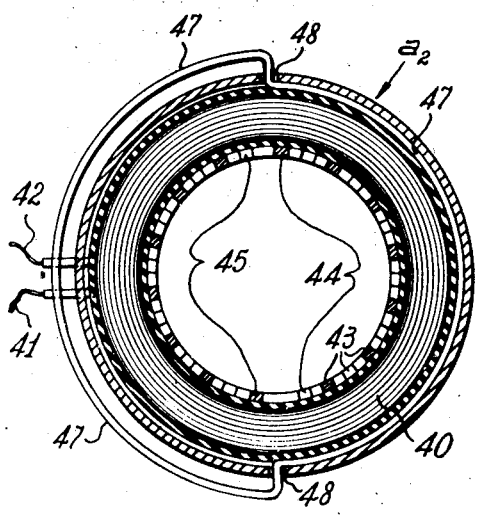
Fig. 6 is a cross-section of the field magnet of a synchronous motor according to a further preferred embodiment of the invention and Fig. 7 is a plan view of the motor shown in Fig. 6.
Figure 6:
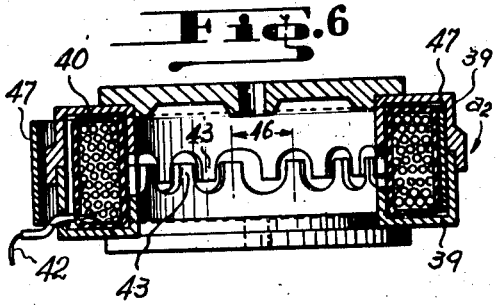

In the embodiments of the synchronous motor shown in Figs. 1 to 4, the polar sections of the stator are formed of separate mechanical units, each one provided with an exciting coil. This offers no difficulty in practice, but it is sometimes desirable to have a motor of the characteristics described, but of much smaller size, for, while the motor illustrated in Figs. 4 and 5 is quite suitable for phonographs, its use in electric clocks would be difficult as a result of its large size consequent on the use of multiple stator and rotors. Figs. 6 and 7 illustrate a synchronous self-starting electric motor particularly suitable for electric clocks due to its very small size; these figures show only the stator $a_2$ of the motor, the rotor employed being exactly similar to that illustrated in Fig. 2. As may be seen in Figures 6 and 7, stator $a_2$ is similar to the polar sections of the multiple stator of the motor shown in Fig. 4, and is formed of an annular body which comprises two substantially equal halves 39, of U-shaped cross-section joined together to enclose an exciting coil 40, terminals 41 and 42 of which are connected to a source of alternating current.

As has already been described in relation to the stator of Fig. 4, each annular half 39 of the stator comprises, on its inner lateral wall, a plurality of teeth 43 grouped, in this example, into two polar sections 44 and 45, each of which includes substantially one half of the periphery of this lateral wall, but which, if required, may include a greater or lesser portion of said periphery. The teeth or poles of one of the polar sections are disposed with a mechanical phase displacement equal to ¼ of the polar spacing with respect to the poles of the other polar section, as may be observed in Fig. 6, where distance 46 is equal to 1+¼ of the polar spacing of the stator.

The two halves 39 are joined in such a way that the teeth or poles 43 of one of the halves fit into the gaps between the teeth 43 of the other half, the stator $a_2$ thus being provided with a plurality of opposite and alternately disposed poles.

To obtain the required electrical phase displacement between the magnetic exciting fields of the two polar sections 44 and 45 of the stator, said stator includes a copper ring 47 which, passing through slots 48 in the external lateral walls of halves 39, extends along the poles of polar section 44 and is lodged in the interior of stator $a_2$, while its remaining part is located along the outer periphery of the stator corresponding to polar section 45. Therefore, with respect to polar section 44, copper ring 47 acts as a short-circuited secondary winding, with the result that the magnetic exciting field of poles 43 of this polar section 44 has its phase electrically displaced by substantially ninety electrical degrees with respect to the magnetic exciting field of polar section 45.

In this manner it has been possible to combine within a motor of simple and economical construction the basic structural characteristics which, according to this invention, make it possible to obtain the desired synchronous rotation and self-starting features. The motors according to the embodiment shown in Figs. 6 and 7 are particularly suitable for electric clocks, as their parts can be easily manufactured to very small dimensions, and at the same time they can be designed to provide a relatively slow speed of rotation.

It will be appreciated that modifications of the disclosed embodiments of my invention are possible without departing from the spirit of my invention or the scope of the appended claims.

What I claim is:

1. A self-starting synchronous electric motor which comprises, as the main constitutive elements, a multipolar field magnet with electromagnetic excitation and a multipolar armature polarized by a permanent magnet, the adjacent polar teeth of opposite polarity of said armature having the same angular spacing as the adjacent polar teeth of opposite polarity of said field magnet, the polar teeth of said field magnet being arranged in sections of equal polar spacing with opposite poles arranged in alternate succession, means to shift the phase of the magnetic exciting field of one polar section of said field magnet with respect to the magnetic exciting field of the adjacent polar section, the poles of adjacent polar sections of one of said elements of the motor being mounted with a mechanical phase difference substantially equal to said electrical phase difference between the magnetic exciting fields.

2. A self-starting synchronous electric motor which comprises, as the main constitutive elements, a field-magnet including a plurality of electromagnetically excited polar teeth and an armature including a plurality of polar teeth excited by a permanent magnet, the adjacent polar teeth of opposite polarity of said armature having the same angular spacing as the adjacent polar teeth of opposite polarity of said field magnet, the polar teeth of said field magnet being arranged in at least two polar sections of equal polar spacing with opposite poles in alternate succession, means to shift the phase of the magnetic exciting field of one polar section of said field magnet with respect to the magnetic exciting field of the adjacent polar section, the poles of adjacent polar sections of one of said elements of the motor being mounted with a mechanical phase difference substantially equal to a fraction of the polar spacing, the numerator of said fraction being equal to unity and the denominator being equal to the number of polar sections multiplied by two.

3. A self-starting synchronous electric motor, comprising a stator provided with a plurality of polar teeth arranged in two polar sections of equal polar spacing with opposite poles in alternate succession, two exciter coils each cooperating with one of said polar sections, means to connect said exciter coils to an alternating current supply source, means to shift the phase of the magnetic field generated by one of said exciter coils with respect to the magnetic field generated by the other exciter coil, the poles of one of said polar sections being mounted with a mechanical phase difference substantially equal to the electrical phase difference between the magnetic exciter fields, a rotor mounted within said stator and including a plurality of teeth constituting opposite poles in alternate succession with a polar spacing equal to that of said stator, and a permanent magnet mounted to excite the polar teeth of said rotor.

4. A self-starting synchronous electric motor comprising a stator including two polar sections each constituted by a core of magnetizable material, an exciting coil mounted on said core, polar pieces mounted on the ends of said core and having curved toothed flanges with the teeth of one flange located in the spacings between the teeth of the other flange to constitute opposite poles in alternate succession, means to connect said exciter coils to an alternating current supply source, a reactor connected in series with one of said coils to shift the phase of the magnetic field of said coil substantially ninety degrees with respect to the magnetic field of the other coil, the poles of said polar sections being mounted with a mechanical phase difference substantially equal to the electrical phase difference between said magnetic fields, a rotor mounted between said toothed flanges and including a plurality of teeth constituting opposite poles in alternate succession with a polar spacing equal to that of said stator, and a permanent magnet mounted to polarize the polar teeth of said rotor.

5. A self starting synchronous electric motor comprising a stator including a plurality of superposed polar sections each constituted of an annular hollow body of magnetizable material formed of two halves of U-shaped cross-section, an exciting coil located within said annular hollow body, the inner lateral wall of said halves being provided with a plurality of teeth arranged equidistantly along the internal periphery of said wall, said halves being joined with the teeth of one half located in the spacings between the teeth of the other half to constitute a plurality of opposite polar teeth in alternate succession, means to connect each of said exciting coils to one of the phases of a multiphase alternating current supply source to shift the phase of the magnetic exciting field of one of said coils with respect to the magnetic exciting fields of the adjacent coils, a rotor mounted within said stator and including an equal number of superposed polar sections each including a plurality of teeth constituting opposite poles in alternate succession with a polar spacing equal to that of the stator, and a permanent magnet mounted on said rotor to polarize said polar teeth of the rotor, the polar sections of said stator being mounted with their poles in mechanical alignment while the polar teeth of one polar section of said rotor are mounted with a mechanical phase difference with respect to the teeth of the adjacent section, said mechanical phase difference being substantially equal to the electrical phase difference between the phases of said multiphase alternating current supply source.

6. A self-starting synchronous electric motor comprising a stator including two superposed polar sections each constituted of an annular hollow body of magnetizable material formed of two halves of U-shaped cross-section, an exciting coil located within said annular hollow body, the inner lateral wall of said halves being provided with a plurality of teeth arranged equidistantly along said internal wall, said halves being joined with the teeth of one half located in the spacings between the teeth of the other half to constitute a plurality of opposite polar teeth in alternate succession, means to connect said exciting coils to an alternating current supply source, a reactor connected in series with one of said coils to shift the phase of the magnetic field of said coils by substantially ninety degrees with respect to the magnetic field of the other coil, the poles of said polar sections of the stator being mounted with a mechanical phase difference between said magnetic fields, a rotor mounted within said stator and including two superposed polar sections each constituted of a permanent magnet, two disc-shaped polar pieces each cooperating with a pole of said magnet and provided with toothed perpendicular rims, the teeth of one of said disc-shaped polar pieces penetrating into the spacings between the teeth of the other disc-shaped polar piece to constitute a plurality of opposite polar teeth in alternate succession with a polar spacing equal to that of said stator, the polar teeth of said superposed polar sections of the rotor being mounted in mechanical alignment.

7. A self-starting synchronous electric motor comprising a stator constituted of an annular hollow body of magnetizable material formed of two halves of U-shaped cross-section, the inner lateral wall of said halves being provided with a plurality of equidistantly spaced teeth arranged in two sections with the teeth of one section being arranged with a mechanical phase difference with respect to the teeth of the other section, said mechanical phase difference being equal to one quarter of the polar spacing of said teeth, said halves being joined with the teeth of one half penetrating into the spacing between the teeth of the other half to constitute a plurality of opposite polar teeth in alternate succession arranged in two polar sections, an exciting coil located within said annular hollow body, means to connect said coil to an alternating current supply source, a copper ring extending with one part thereof along the polar teeth of one of said polar sections within said annular hollow body, while the remaining part of said ring extends along the external periphery of said body corresponding to said other polar section of the stator to shift the phase of the magnetic fields of said coils by substantially ninety electrical degrees, and a rotor mounted within said stator and including a permanent magnet, two disc-shaped polar pieces each cooperating with a pole of said magnet and provided with toothed perpendicular rims, the teeth of one of said disc-shaped polar pieces penetrating into the spacings between the teeth of the other disc-shaped polar piece to constitute a plurality of opposite polar teeth in alternate succession with a polar spacing equal to that of said stator.

RAUL MARIANO ORZABAL.

REFERENCES CITED

The following references are of record in the file of this patent:

UNITED STATES PATENTS

| Number | Name | Date |
| --- | --- | --- |
| 2,081,993 | Gebhardt et al. | June 1, 1937 |